No. 637,785. Patented Nov. 28, 1899.
E. M. HEWLETT.
PROTECTING STATIC VOLTMETERS.
(Application filed July 15, 1898.)
(No Model.)
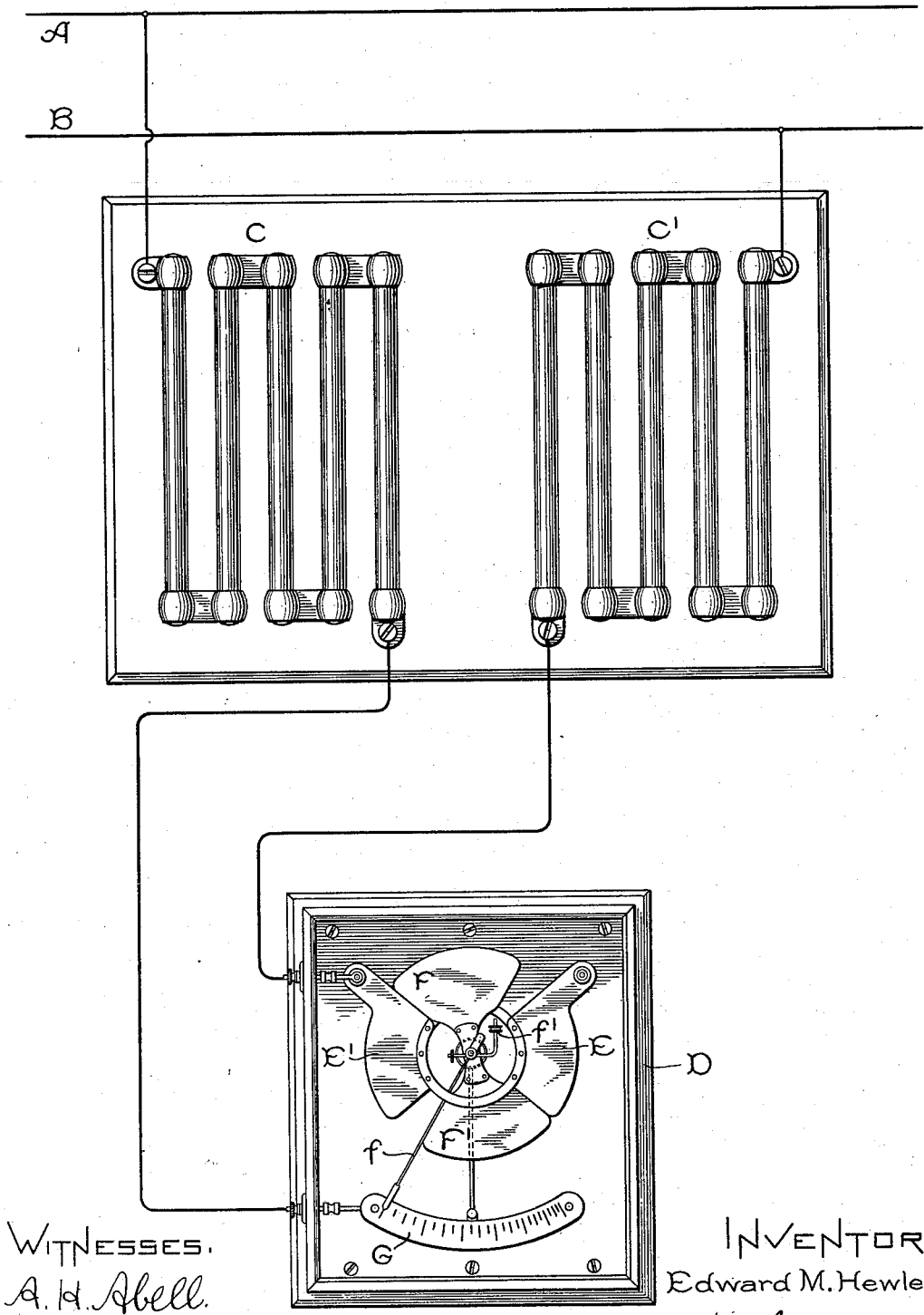
WITNESSES.
A. H. Abell.
A. F. Macdonald.
INVENTOR.
Edward M. Hewlett.
by Albert G. Davis.
Atty.

UNITED STATES PATENT OFFICE.

EDWARD M. HEWLETT, OF SCHENECTADY, NEW YORK, ASSIGNOR TO THE GENERAL ELECTRIC COMPANY, OF NEW YORK.

PROTECTING STATIC VOLTMETERS.

SPECIFICATION forming part of Letters Patent No. 637,785, dated November 28, 1899.

Application filed July 15, 1898. Serial No. 685,994. (No model.)

*To all whom it may concern:*

Be it known that I, EDWARD M. HEWLETT, a citizen of the United States, residing at Schenectady, in the county of Schenectady and State of New York, have invented certain new and useful Improvements in Protecting Static Voltmeters, (Case No. 631,) of which the following is a specification.

My present invention concerns electrostatic measuring instruments, the best example of which is the electrostatic voltmeter, which by a modified construction is also used as a ground detector. This is a well-known form of instrument applicable particularly to alternating currents and is particularly useful with high-voltage circuits; but such an instrument must necessarily form a short circuit across the line, except for the air-gap, which must be made very small in order to secure sensitiveness, and if for any reason the potential should rise so far as to break down the air-barrier a considerable amount of damage might be done. As the instrument operates entirely by charge and normally carries no current, I have found that it can be efficiently protected by including between it and the lines resistance in series sufficient in amount to cut down the current-flow, so that no destructive arc could be maintained between the opposed surfaces of the instrument, even if the air-gap should break down. This resistance may be inductive or non-inductive in character. For some reasons it is desirable that it should be inductive. I am not, however, limited in this regard, and in the accompanying drawing, which shows an embodiment of the invention, I have illustrated a resistance of non-inductive character upon each side of the instrument. This is a convenient disposition; but it is not imperative that the resistance be divided. It is, however, desirable, because it affords protection to both sides of the circuit in case of an accidental ground.

In the drawing, A B are the high-potential lines of an alternating-current system, and C C' are the resistances, each connected to one of these lines. Each of the resistances is connected to a terminal of the voltmeter D, which is shown as of the usual type, provided with "stationary quadrants" (as they are commonly called) E E', which are extended surfaces of conducting metal. The vanes F F' are attached to the needle $f$, which moves over the scale G. A counterpoise $f'$ is provided, as usual. The scale G is electrically connected to the needle, so that the vanes F F' and the scale form one side of the circuit, while the quadrants, which are electrically connected together, form the other. The particular type of measuring instrument is, however, unimportant, and I have simply described a well-known form for which any other might be substituted. Not only does my improvement protect the instrument against the destructive effect of an accidental arc following the spark passing from one side of the circuit to the other, but it also enables me to safely reduce the distance between the moving and stationary parts of the voltmeter, so that I amplify its readings and make it very sensitive to small differences of potential.

The operation of the resistance affording the results pointed out may be briefly described as follows: Since the instrument works by charge and not by current-flow, so long as the insulation is perfect the potential between its opposed surfaces will be the same irrespective of the resistance that may be in circuit with it. If a spark, however, should puncture the air-insulation, under ordinary circumstances a destructive arc would be formed; but as soon as current begins to flow the high resistance causes such a drop in voltage that the difference of potential can no longer maintain the arc between the opposed surfaces, and it is extinguished without harm to the apparatus.

What I claim as new, and desire to secure by Letters Patent of the United States, is—

1. The combination with an electrostatic instrument, of an impedance in series relation thereto and to the source of energy, said impedance being sufficiently high to prevent the maintenance of an arc if the potential rise sufficiently to leap the air-gap between the fixed and movable members.

2. The combination with an electrostatic instrument, of a resistance in series relation to said instrument and a source of electric energy, said resistance being sufficiently high to prevent the maintenance of an arc if the potential should rise high enough to leap the air-gap between the fixed and movable members.

3. The combination, with an alternating-current circuit and an electrostatic instrument connected across the circuit, of a resistance between each main and the instrument sufficient in amount to substantially prevent current-flow, even if the instrument breaks down.

In witness whereof I have hereunto set my hand this 12th day of July, 1898.

EDWARD M. HEWLETT.

Witnesses:
 B. B. HULL,
 G. HAYNES.